United States Patent [19]

Harrison

[11] Patent Number: 5,539,991
[45] Date of Patent: Jul. 30, 1996

[54] ADJUSTABLE SHEATHING SQUARE

[75] Inventor: Michael W. Harrison, Brumley, Mo.

[73] Assignee: Terry Blankenship, Iberia, Mo.; a part interest

[21] Appl. No.: 313,786

[22] Filed: Sep. 28, 1994

[51] Int. Cl.$^6$ ..................................................... B43L 7/12
[52] U.S. Cl. .................................. 33/471; 33/42; 33/424
[58] Field of Search ............................ 33/418, 452, 465, 33/466, 467, 468, 469, 470, 471, 492, 42, 424, 426, 498, 499

[56] References Cited

U.S. PATENT DOCUMENTS

| D. 260,616 | 9/1981 | Groves | D10/65 |
|---|---|---|---|
| 766,562 | 8/1904 | Wertz | 33/471 |
| 901,113 | 10/1908 | Losch | 33/498 |
| 1,242,467 | 10/1917 | Peirce | 33/418 |
| 1,331,415 | 2/1920 | Civitts | 33/471 |
| 1,549,271 | 8/1925 | Larson | 33/469 |
| 4,562,649 | 1/1986 | Ciavarella | 33/465 |
| 4,611,407 | 9/1986 | van Gorp | 33/471 |
| 4,697,351 | 10/1987 | Hopfer | 33/420 |
| 4,729,173 | 3/1988 | Wilson | 33/471 |
| 4,901,444 | 2/1990 | Maschmeier | 33/465 |

FOREIGN PATENT DOCUMENTS

| 220380 | 3/1910 | Germany | 33/468 |
|---|---|---|---|
| 4955141 | 9/1990 | U.S. | 33/471 |
| 19535 | of 1893 | United Kingdom | 33/470 |

Primary Examiner—William A. Cuchlinski, Jr.
Assistant Examiner—G. Bradley Bennett
Attorney, Agent, or Firm—Jonathan A. Bay

[57] ABSTRACT

An adjustable square device for scribing cut lines on large flat panels. The device has as a base member a straight, flat, rectangular bar. Pivotally connected at one end to the base member is an angularly adjustable pivot arm, also comprising a straight, flat, rectangular bar having an arcuate extension on one where such pivot arm is connected to the base member. The arcuate extension extends through a slot in the base member and is marked in degrees to form a quarter circle protractor integral with the pivot arm. Such protractor contains therein an arcuate groove, parallel with the outer edge of such arcuate extension and spaced inwardly therefrom. An adjustable stop extends through said groove and through the base member. The arcuate extension is pivoted on a pin affixed at the end thereof to the base member. Releasing the adjustable stop permits the pivot arm to be angled relative to the base member to the desired degree as indicated on the protractor. A short bar member is affixed to the base of the pivot arm to stop the swing thereof at a right angle to the base member. A further support bar extends medially from the base member at the end thereof remote from the pivot arm to permit the square device to be used either side up.

4 Claims, 4 Drawing Sheets

ADJUSTABLE SHEATHING SQUARE

BACKGROUND OF THE INVENTION

1. Field of the Invention

The present invention relates to a carpenter's tool and more particularly pertains to a reversible adjustable square which may be used to scribe cut lines on large flat panels such as plywood.

2. Description of the Prior Art

The use of adjustable squares is known in the prior art. More specifically, such squares heretofore devised and utilized for the purpose of holding work pieces at specific angles or for marking are known to consist basically of familiar, expected and obvious structural configurations, notwithstanding the myriad of designs encompassed by the crowded prior art which have been developed for the fulfillment of countless objectives and requirements. Typical devices of this type are illustrated in U.S. Letters Pat. Nos. 4,955,141; 4,729,173; 4,562,649; 4,697,351; and Des. 260,616.

In this respect, the adjustable square according to the present invention substantially departs from the conventional concepts and designs of the prior art, and in so doing provides an apparatus primarily developed for the purpose of scribing lines at desired angles on large scale work pieces, and of being reversed to permit marking of opposite angles.

Therefore, it can be appreciated that there exists a continuing need for new and improved adjustable squares which can be used with large, flat work pieces. In this regard, the present invention substantially fulfills this need.

SUMMARY OF THE INVENTION

In view of the foregoing disadvantages inherent in the known types of adjustable squares now present in the prior art, the present invention provides an improved adjustable square construction wherein the same can be utilized for easily and quickly scribing cut lines on large flat surfaces. As such, the general purpose of the present invention, which will be described subsequently in greater detail, is to provide a new and improved adjustable square device which has all the advantages of the prior art devices and none of the disadvantages.

To attain this, the present invention essentially comprises an adjustable square device for scribing cut lines on large flat panels. The device has as a base member a straight, flat, rectangular bar. Pivotally connected at one end to the base member is an angularly adjustable pivot arm, also comprising a straight, flat, rectangular bar having an arcuate extension on the one where such pivot arm is connected to the base member. The arcuate extension extends through a slot in the base member and is marked in degrees to form a quarter circle protractor integral with the pivot arm. Such protractor contains therein an arcuate groove, parallel with the outer edge of such arcuate extension and spaced inwardly therefrom. An adjustable stop extends through said groove and through the base member. The arcuate extension is pivoted on a pin affixed at the end thereof to the base member. Releasing the adjustable stop permits the pivot arm to be angled relative to the base member to the desired degree as indicated on the protractor. A short bar member is affixed to the base of the pivot arm to stop the swing thereof at a right angle to the base member. A further support bar extends medially from the base member at the end thereof remote from the pivot arm to permit the square device to be used either side up.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable square which has all the advantages of the prior art devices and none of the disadvantages.

It is another object of the present invention to provide a new and improved adjustable sheathing square which may be easily and efficiently manufactured and marketed.

It is a further object of the present invention to provide a new and improved adjustable sheathing square which is of a durable and reliable construction.

An even further object of the present invention is to provide a new and improved adjustable sheathing square which is susceptible of a low cost of manufacture with regard to both materials and labor, and which accordingly is then susceptible of low prices of sale to the consuming public, thereby making such squares economically available to the buying public.

Still yet another object of the present invention is to provide a new and improved adjustable square which provides in the apparatuses of the prior art some of the advantages thereof, while simultaneously overcoming some of the disadvantages normally associated therewith.

Still another object of the present invention is to provide a new and improved adjustable square suitable for use on large flat work pieces.

A still further object is to provide a new and improved adjustable square device which can be reversed to permit using on either side.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
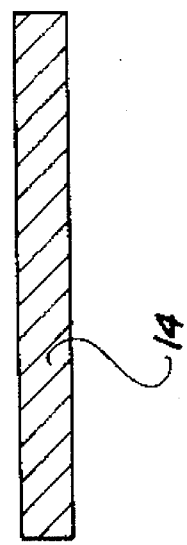
FIG. 2 is a sectional view taken on line 2—2 of FIG. 1.
Figure 1:
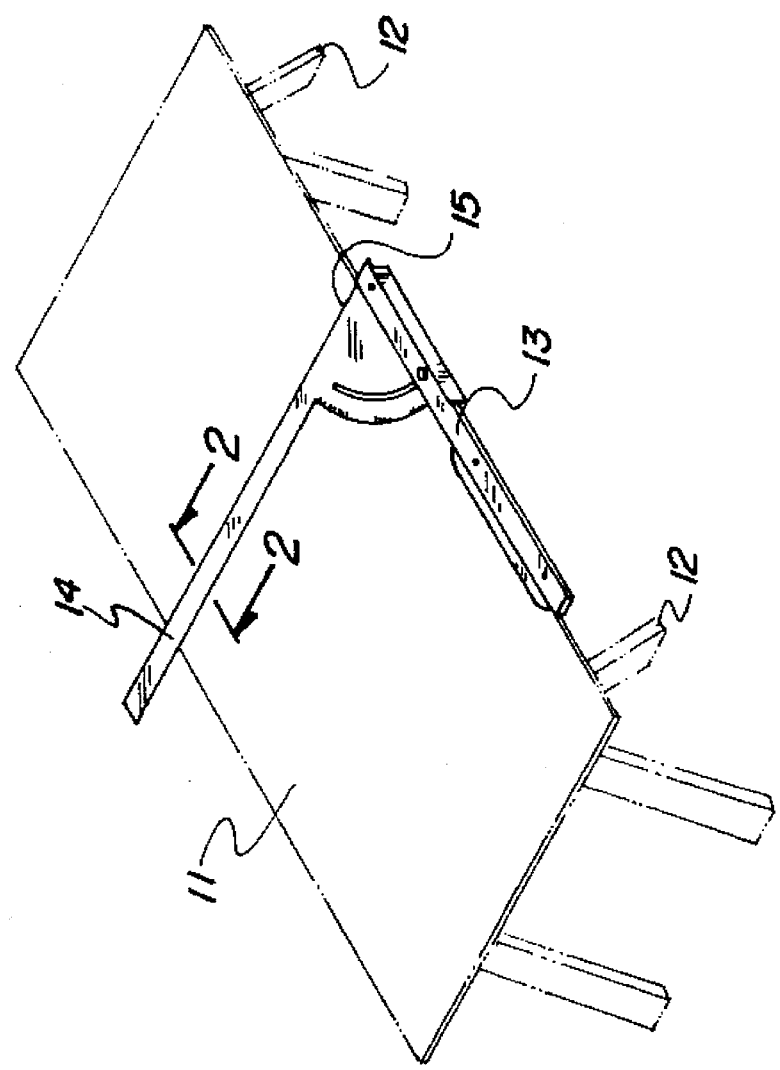
FIG. 1 is a perspective view of the square device of the present invention in operative position on a flat work piece.

With reference now to the drawings, and in particular to FIGS. 1 and 2 thereof, a new and improved adjustable sheathing square embodying the principles and concepts of the present invention and generally designated by the reference numeral 10 will be described.

More specifically, it will be noted that the adjustable sheathing square device 10 of the present invention is designed to be placed on a large flat work piece 11 (shown in broken lines) and here illustrated as being placed on a pair of saw-horses 12 (also shown in broken lines). The two main components of square 10 are a base member comprising a long, flat, rectangular bar 13 and a second long, flat, rectangular bar forming a pivot arm 14. The pivot arm 14 has an integral arcuate extension 15 adjacent the contact point with base member 13 and is designed to slide into and through base member 13 in use. Further details are illustrated in subsequent drawings.

Figure 3:
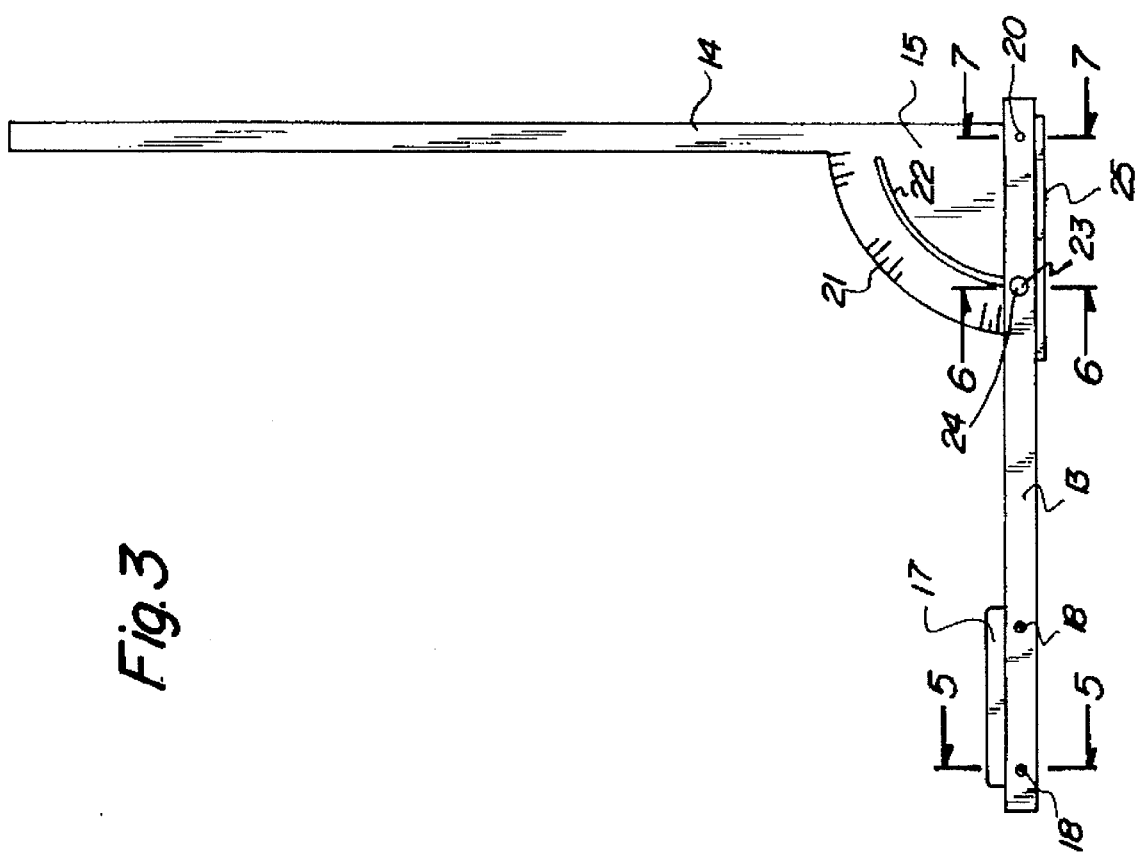
FIG. 3 is a top plan view of the square device of the present invention.

FIG. 3 shows in detail the main and supplemental elements of device 10. Since the pivot arm 14 extends through base member projecting support bar 17 is provided extending medially from the side of the outer end of base member 13 and is secured thereto by machine bolts 18 as shown in detail in FIG. 5. This keeps base member 13 level with respect to work piece 12 (see FIG. 1). Base member 13 is pivotally connected to pivot arm 14 by a pivot pin 20 positioned at the inner end of base member 13 and shown in detail in FIG. 7. The arcuate portion 15 of pivot arm 14 is marked off with indicia 21 indicating degrees and making such arcuate portion 15 in effect a protractor scale. Cut within the arcuate portion 15 is a curved groove or slot 22, paralleling the outer curved edge of arcuate portion 15. Extending from the surface of base member 13 through such slot 22 is an adjustable lock member 23 controlled by a knob 24 affixed to the end thereof (and shown in detail in FIG. 6).

The end of pivot arm 14 which extends through base member 13 terminates in a raised rectangular stop 25 which prevents pivot arm 14 from swinging beyond a right angle to base member 13.

Figure 4:
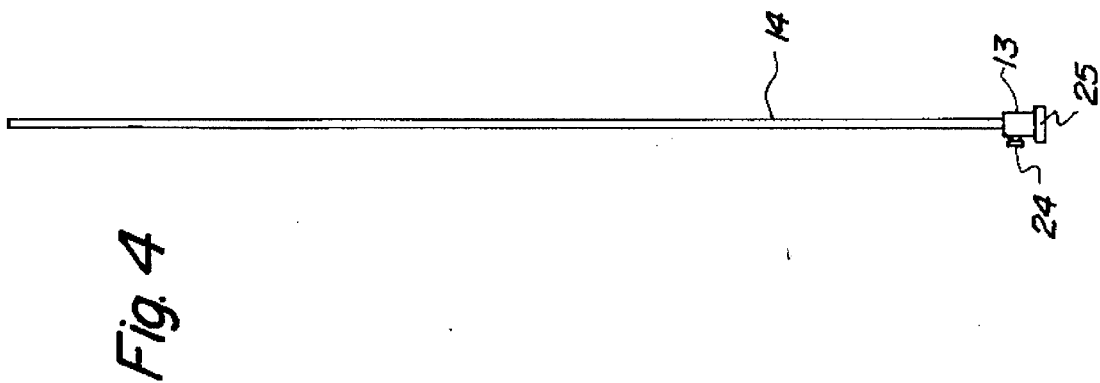
FIG. 4 is a side plan view of the device of FIG. 3.

FIG. 4 shows an end view which further illustrates stop 25 and the knob 24 for lock member 23.

Figure 6:
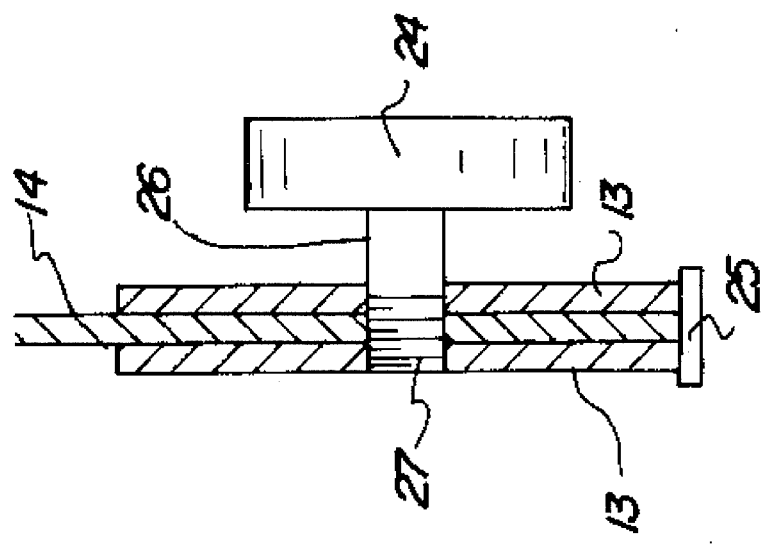
FIG. 6 is a sectional view on line 6—6 of FIG. 3.
Figure 5:
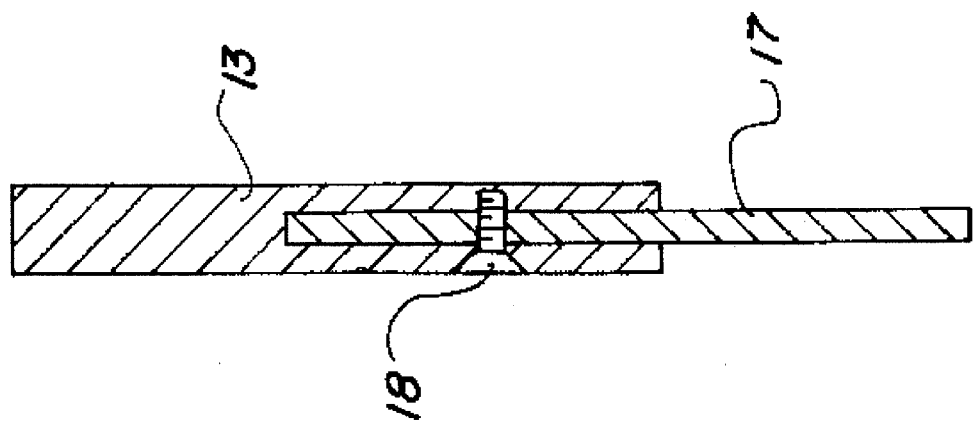
FIG. 5 is a sectional view on line 5—5 of FIG. 3.
Figure 7:
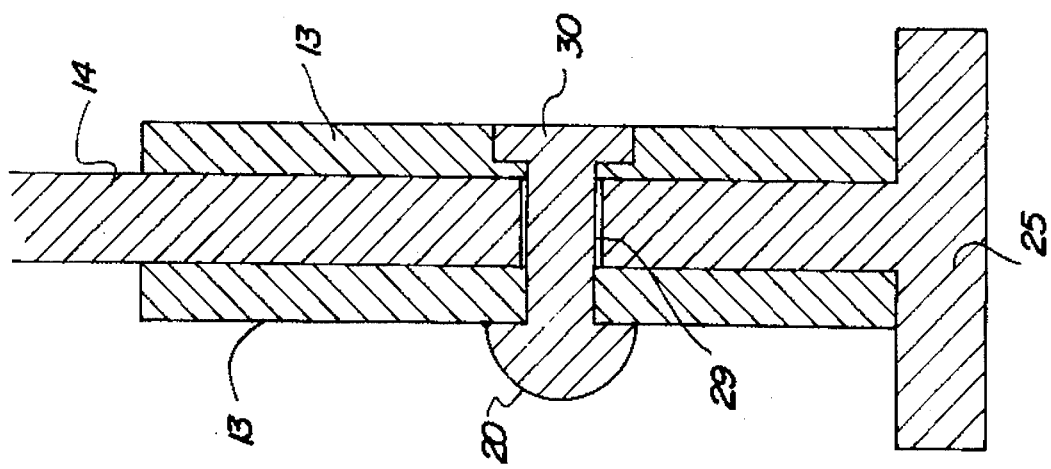
FIG. 7 is a sectional view on line 7—7 of FIG. 3.

FIGS. 5 through 7 illustrate in sectional views the elements identified above. FIG. 5 shows the projecting bar support 17 extending medially from base member 13 and one of the retaining machine bolts 18 fastening support 17 to member 13.

FIG. 6 shows the lock member 23 as comprising a stud 26 threaded at its lower end 27 to adjustably engage base member 13 and the interposed pivot arm 14. Rotation of knob 24 affixed to stud 26 will tighten or loosen the interface between base member 13 and pivot arm 14 to permit angular locking of the members 13 and 14 in the desired angular configuration. As the pivot arm 14 is swung, it slides through base member 13 with the stud 26 riding in the arcuate slot 22 shown in FIG. 3.

FIG. 7 illustrates the pivot point for members 13 and 14, showing the pivot pin 20 extending through base member 13 with sufficient clearance as is shown at 29 as to permit pin 20 to easily move relative to such base member 13. The base 30 of pivot pin 20 is affixed in a flush mount to the bottom of base member 13. Also shown in this FIG. 7 as well as in FIG. 6 is the projecting rectangular stop 25 forming the lower end of pivot arm 14.

Figure 8:
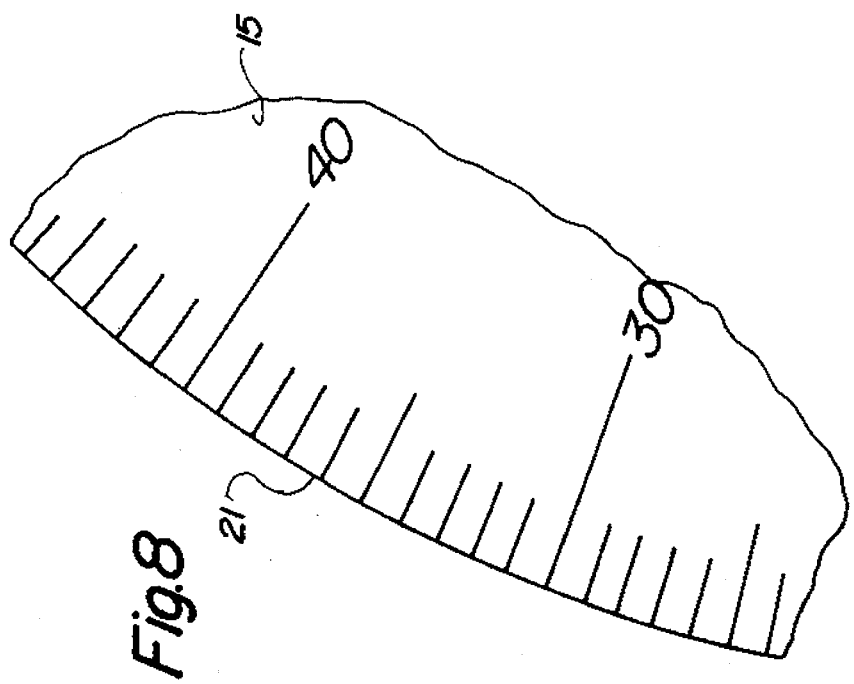
FIG. 8 is an enlarged plan view of a portion of the top surface of the arcuate member shown in FIG. 3.

FIG. 8 is merely an enlargement of the indicia 21 on the arcuate portion 15 of pivot arm 14.

Construction of the device of the present invention can utilize any rigid material for the arms, e.g. metal, heavy plastic, wood or the like.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable sheathing square for layout work on large flat work pieces, comprising:

a pair of long, straight, flat, rigid rectangular members pivotally connected one to the other at one end of each of said members, one of said members being a base member and the other of said members being a pivot arm;

an arcuate extension on one end of the pivot arm extending through the body of said base member, said arcuate extension having an upper surface and a lower surface adjacent the pivoted connection of said base member;

means for releasably securing said base member and said pivot arm in a desired angular relationship one to the other; and, a support member secured to and extending from said base member at a location substantially spaced from the pivoted connection of said base member;

wherein said support member is configured to be as comparably flat as, and is arranged on the base member to extend substantially coplanar with, the pivot arm, including the arcuate extension thereof, both so that said base member remains parallel with a plane of said pivot arm when placed on a work surface, and, so that said base member, said pivot arm and said support member operate equally well when said adjustable sheathing square is either side up.

2. The adjustable sheathing square of claim 1 wherein the pivot arm includes a stop member that is cooperative with an abutment on the base member for limiting one extreme angular adjustment of the pivot arm to a right angle with the base member.

3. The adjustable sheathing square of claim 1 wherein said arcuate extension is marked on its upper surface with indicia representing degrees of angularity with said base member.

4. The adjustable sheathing square of claim 1 wherein said means for releasably securing said base member and said pivot arm in a desired angular relationship is a stud member having a knob affixed at one end thereof and a threaded section at the other end, said stud member extending from the surface of said base member through an arcuate slot in said pivot arm and threadably engaging both said pivot arm and said base member to secure them relative to each other.

* * * * *